United States Patent [19]

Marugg

[11] Patent Number: 4,764,724
[45] Date of Patent: Aug. 16, 1988

[54] MEASURING HEAD FOR INDUCTIVE MEASUREMENT OF THE THICKNESS OF AN INSULATING LAYER ON AN ELECTRIC CONDUCTOR

[75] Inventor: Leo Marugg, Gams, Switzerland

[73] Assignee: Zellweger Uster Ltd., Uster, Switzerland

[21] Appl. No.: 867,506

[22] Filed: May 28, 1986

[30] Foreign Application Priority Data

May 28, 1985 [CH] Switzerland .................... 02235/85

[51] Int. Cl.⁴ .................... G01B 7/10; G01R 33/12
[52] U.S. Cl. .................... 324/230; 324/236; 324/262
[58] Field of Search .................... 324/229–231, 324/234–243, 262, 207, 208

[56] References Cited

U.S. PATENT DOCUMENTS

| | | | |
|---|---|---|---|
| 1,869,336 | 7/1932 | De Forest | 324/228 |
| 2,033,654 | 3/1936 | Selquist et al. | 324/230 X |
| 2,572,908 | 10/1951 | Brenholdt | 324/229 |
| 2,751,552 | 6/1956 | Brenner et al. | 324/230 |
| 3,165,726 | 1/1965 | Riley et al. | 324/229 X |
| 3,354,385 | 11/1967 | Wood et al. | 324/234 |
| 3,760,264 | 9/1973 | Zumbach . | |
| 3,948,082 | 4/1976 | Zumbach et al. . | |
| 4,005,360 | 1/1977 | Ott | 324/230 |
| 4,041,378 | 8/1977 | Ott | 324/230 X |
| 4,051,430 | 9/1977 | Millette et al. | 324/230 X |
| 4,507,609 | 3/1985 | Madewell | 324/230 |
| 4,649,343 | 3/1987 | Birchak et al. | 324/220 |

FOREIGN PATENT DOCUMENTS 599601 3/1948 United Kingdom ............... 324/230
2145827 4/1985 United Kingdom .

Primary Examiner—Gerard R. Strecker
Attorney, Agent, or Firm—Burns, Doane, Swecker & Mathis

[57] ABSTRACT

A measuring head has a coil and a contact part for contacting an insulating layer whose thickness is to be measured. The construction and arrangment of the coil are so chosen that in the region of the end face of the contact part, the geometric locations of the points of the conductor which produce an identical change in inductance of the coil lie on concentric circles. The end face of the contact part has a contour which conforms to these concentric circles. Measurement of the thickness of an insulating layer such as a cable sheath thereby becomes independent of the relative position between the measuring head and the material being measured. Accurate guidance of the cable is no longer necessary.

20 Claims, 2 Drawing Sheets

MEASURING HEAD FOR INDUCTIVE MEASUREMENT OF THE THICKNESS OF AN INSULATING LAYER ON AN ELECTRIC CONDUCTOR

BACKGROUND OF THE INVENTION

The present invention relates to a measuring head for the inductive measurement of the thickness of an insulating layer of an electric conductor, of the type which comprises a coil and a contact part designed to be placed on the conductor having the insulating layer to be measured.

A measuring head of this kind for measuring the thickness of the insulation on cables is disclosed in DE-AS No. 1,673,888. The contact surface of the head has a groove for receiving the cable to be measured. Other measuring heads use a flat contact surface. A measuring head having a groove for a cable can only be used for a particular range of diameters, so that at least the part of the measuring head containing the contact surface must be changed for diameters outside this range. Further, both the measuring heads with a groove and the measuring heads with a flat contact surface have one serious disadvantage, namely unacceptably high errors in measurement which occur when the surface of the conductor does not have a geometrically simple form such as a flat or a cylindrical surface.

Cable sheaths are always more or less irregular in structure and are therefore not perfectly circular. As a result, the measuring head will from time to time come to lie at a position on the cable which is situated at some distance from the point to be measured even if the cable is very accurately guided and positioned. The wall thickness recorded in the measurement will then deviate from the true wall thickness and a false result will be obtained.

There have already been attempts to use moving measuring heads which adapt to the surface of the cable, but these have been found to be highly susceptible to trouble and have therefore not become established in practice.

The object of the present invention is to provide a measuring head which is so designed that the irregular structure of a cable sheath cannot falsify the measurement and errors in measurement due to imperfect contact of the measuring head with the cable sheath are eliminated.

STATEMENT OF THE INVENTION

To solve this problem according to the invention, the coil is so designed and arranged that in the region of the end face of the contact part the geometrical locations of the points of a conductor which produce the same change in coil inductance or coil quality factor always lie on concentric circles and this end face of the contact part has a contour adapted to these concentric circles.

The design of the coil in accordance with the invention enables the contour of the contact part to be adapted to geometrical locations of equal change in coil inductance or coil quality. If the coil is the oscillation coil of an LC oscillator or forms part of a measuring bridge, then these geometric locations are the points of equal detuning of the oscillatory circuit or imbalancing of the measuring bridge. The measurement of the thickness of a cable sheath therefore becomes independent of the direction, and the position of the object being measured relative to the measuring head becomes immaterial. The measuring head according to the invention is free from moving parts and therefore requires no servicing. Another important advantage is that since axial deviations are now permissible, the cable need not be accurately guided, and the construction of the whole measuring device can therefore be even further simplified.

BRIEF DESCRIPTION OF THE DRAWINGS

The invention is described below with reference to a preferred embodiment illustrated in the figures, in which.

DETAILED DESCRIPTION

Figure 1:
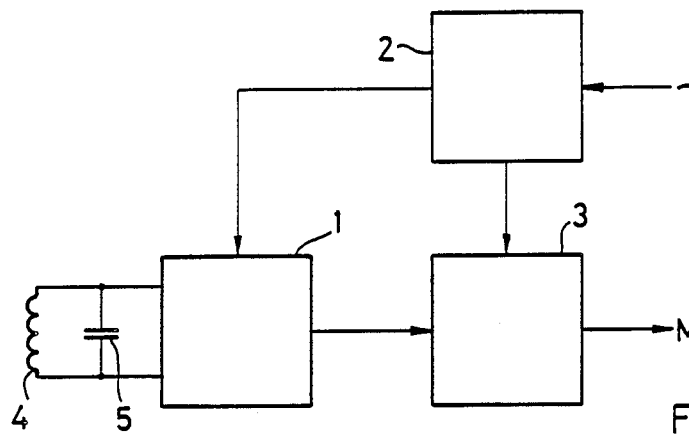
FIG. 1 is a block circuit diagram of the electric parts of a measuring head.

Referring to FIG. 1, the electric equipment of a measuring head consists substantially of an LC oscillator 1 supplied with an alternating voltage by way of a voltage stabilizing stage 2 and producing a measuring signal M by way of an amplifier 3. The LC oscillator is an oscillatory circuit comprising a coil 4 and a condenser 5. The coil 4 is the measuring coil for the inductive measurement of thickness. Instead of the LC oscillator 1, a measuring bridge (not shown) could be used for the inductive measurement of thickness.

When an alternating current flows through the coil 4, it produces a magnetic stray field. An electric conductor placed in this field changes the inductance and quality of the coil and hence the frequency of the oscillatory circuit of the LC oscillator or the balance of the measuring bridge. The oscillatory circuit or measuring bridge is thus detuned by the conductor placed in the field of the coil 4 and the magnitude of this detuning depends upon the distance of the conductor. If the relationship between this distance and the magnitude of detuning is known, then the detuning represented by the measuring signal M is a measure of the distance to the conductor. If the coil 4 is built into a measuring head placed on a conductor covered with an insulating layer, then this distance is equal to the thickness of the insulation, which may thus be determined by the amount of detuning.

Figure 2A:
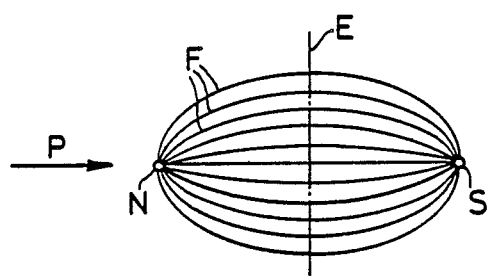
FIGS. 2a, 2b, 3a, 3b, 4a and 4b are sketches to illustrate the principles of the invention.
Figure 2B:
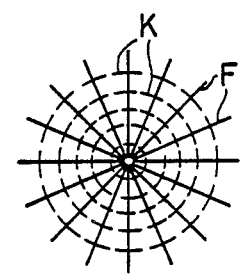

FIG. 2 illustrates schematically the magnetic field between two point poles N and S with lines of flux F extending from the north pole N to the south pole S. If a plane E perpendicular to the axis of connection between the poles N and S is passed through this magnetic field, then the geometric locations of equal field strengths always lie on a circle and the respective circles are concentric. The circles K are indicated in broken lines in FIG. 2b, which is an end face view in the direction of the arrow P of FIG. 2a. The circles K are at the same time the geometric locations of those points of a conductor in the magnetic field which produces the same amount of change in coil inductance of a coil represented by the poles N and S and hence also the same detuning of the LC oscillatory circuit containing the coil (FIG. 1).

Figure 3A:
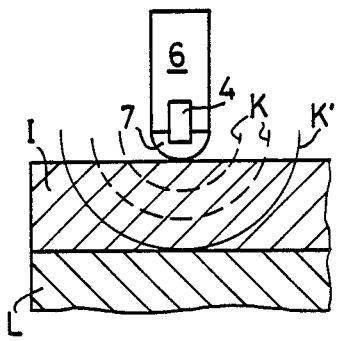
Figure 3B:
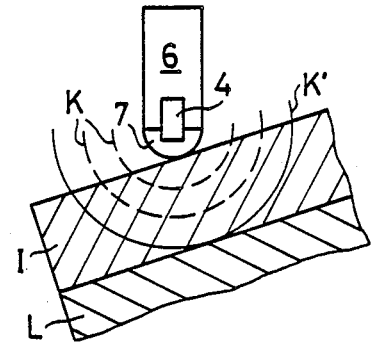

FIGS. 3a, 3b and 4a, 4b represent schematically a measuring head 6 having a coil 4 and a contact part 7 designed to be placed on the object to be measured. The object to be measured is represented in FIGS. 3a, 3b by a conductor L in the form of a strip with insulation I and in FIGS. 4a, 4b by a cable C with insulating sheath I.

The coil 4 is so designed that, as in FIG. 2b, the geometric locations of the points of a conductor which produce the same change in coil inductance lie on concentric circles K in a plane perpendicular to the axis connecting the poles. In the figures, this plane is the plane of the drawing. The contact part 7 has a contour adapted to one of these concentric circles K.

In FIG. 3a, the measuring head 6 and conductor L with insulation I take up the ideal measuring position, i.e. the measuring head 6 is perpendicular to the conductor to be measured. In FIG. 3b, the measuring head 6 and material to be measured enclose an acute angle but the surface of the conductor L just touches the circle K' in the same manner as in FIG. 3a so that the same detuning of the LC oscillatory circuit is obtained in both cases (FIG. 1). It will be seen from this arrangement that the described construction of the coil 4 and of the contact part 7 renders measurement of the thickness of the insulation I independent of the direction, and the relative position of measuring head to material being measured has no influence on the result.

Figure 4A:
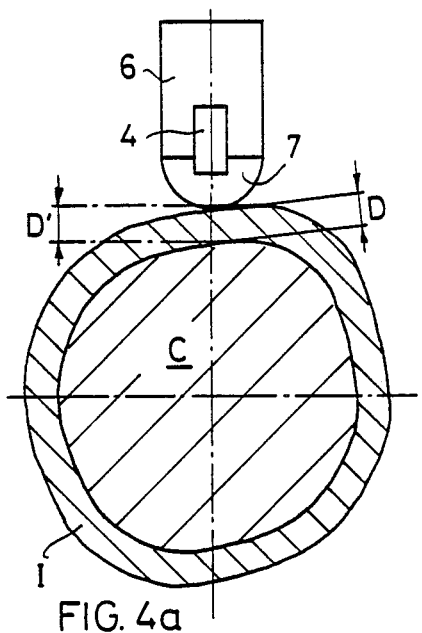

FIG. 4a illustrates the example of the measurement of a non-circular cable C. Since the contact part 7 of the measuring head 6 is rounded off and therefore lies on the sheath I only along a line of contact or, as shown in FIGS. 5a and 5b, only at a point of contact, the correct thickness D of the sheath I is again measured If one imagines the measuring head having a flat contact surface, it will be seen that in such a case a much greater thickness of sheath D' would be measured.

Figure 4B:
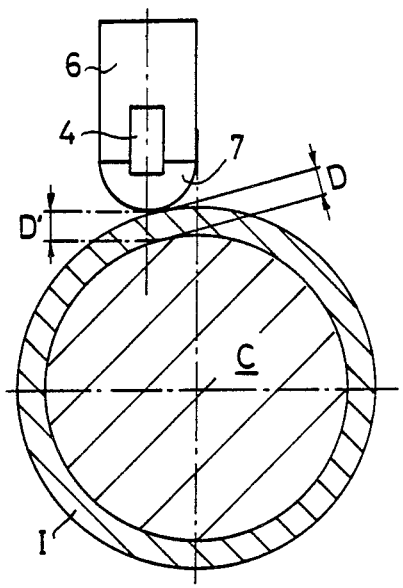

FIG. 4b illustrates the measurement of a cable C which is circular but does not lie in the axis of the measuring head. It will be seen that in spite of the axial deviation, the measuring head will give the correct value for the thickness D of the sheath I, in contrast to a conventional measuring head which would give the result D' for the thickness of the sheath.

The magnetic field represented in FIG. 2 assumes that the two magnetic poles N and S are in the form of points although in practice, of course, such point poles do not exist. However, this does not constitute any limitation to the present invention. First, the condition that the geometric locations of equal detuning must lie on concentric circles need not be fulfilled over the whole circumference of 360 degrees; it is sufficient, for example, if this condition is fulfilled over a circular arc of about 120 degrees. Secondly, the condition need only apply to a limited range of distances. With these limitations, the desired field may be produced with a coil having a U-shaped or E-shaped core.

Figure 5A:
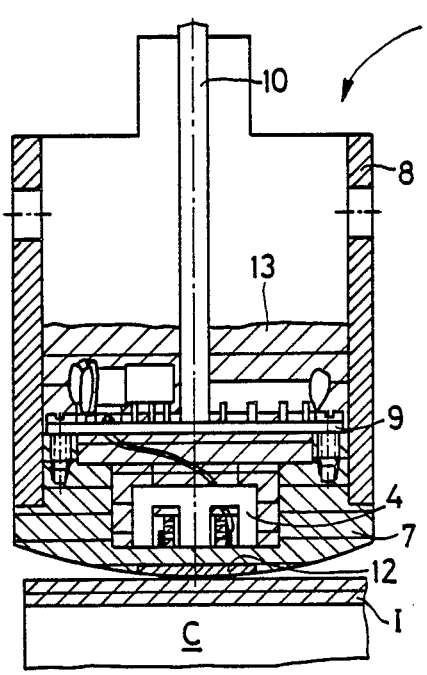
FIGS. 5a and 5b are two views in section through a measuring head according to the invention.
Figure 5B:
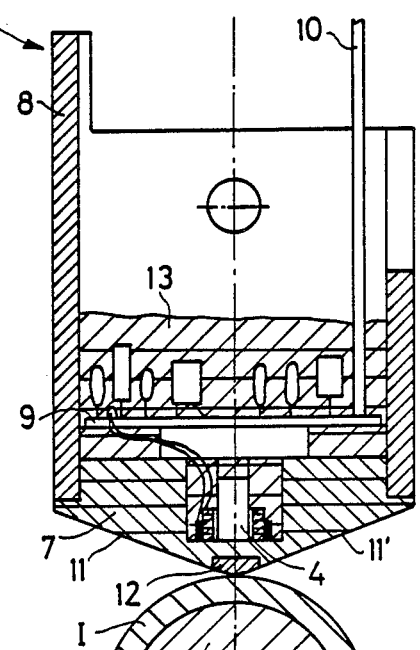

FIGS. 5a and 5b each represent a section through a measuring head 6. The plane of the section of the FIG. 5a embodiment passes through the axis of a cable C which is to be measured while the section plane of FIG. 5b extends perpendicularly to this axis.

The measuring head 6 is composed as illustrated of a tubular housing 8 made, for example, of aluminum and having the contact part 7 inserted in its free end face.

The coil 4, which in the drawing has an E-shaped core, is arranged in a central recess of the contact part 7. Above the coil 4, a printed circuit board 9 with the necessary electronics is screwed to the contact part 7. A connecting cable 10 in the housing 8 extends upwards from the circuit board 9, and the space inside the housing 8 above the board 9 is filled with a suitable casting resin 13.

The contact part 7 consists of a suitable synthetic resin, for example a polyoxymethylene such as Delrin marketed by duPont, and has a contour which is adapted to the concentric circles K (FIG. 2b) of equal change in inductance of the coil 4 and enables the contact part 7 to make, as far as possible, only point contact with the sheath I of the cable C. More particularly, as shown in the cross-sectional view of FIG. 5a, the end face of the contact part 7 is curved in the form of a lens in the direction of the line of flux of the coil 4, that is to say in the longitudinal direction of the E-shaped core of the coil. The radius of this curvature can be any suitable arbitrarily chosen value that enables the end face to make point contact, to the extent that is practical, along the direction of flux.

When viewed in the other direction (FIG. 5b), the contact part is gable shaped, being composed of two side parts 11, 11' set at an angle to one another with the transition between the two parts being slightly rounded off. The inclination of the side parts 11, 11' conforms to the concentric circles K (FIG. 2b). More particularly, the face of the contact part need not be arcuate across the entirety of the surface. Rather, as shown in FIG. 5b, the two side parts 11, 11' can be linear. As long as these intersect at a relatively obtuse angle of about 120 degrees to 150 degrees, and preferably 140 degrees between the two side parts 11, 11', the shape has the effect of a contour in the form of a circular arc. Thus, in the context of the present invention, the characterization of a surface as conforming to a concentric circle K encompasses surfaces having linear portions which intersect in this range of obtuse angles as well as surfaces which are arcuate in shape.

The two side parts 11, 11' could, of course, be even more closely adapted to the form of the concentric circles K, i.e. the contact part 7 could have a more pronounced circular arc contour in the section of FIG. 5b. Owing to the diameter of the measuring head 7, however, the illustrated contour is to be preferred since it also has all the advantages mentioned above.

A small sapphire plate 12 is inserted in the end face of the contact part 7 in the region of the coil 4 in order to reduce as far as possible any wear on the end face by the material being measured.

The measuring head 6 is mounted in a suitable holder of a measuring apparatus. This apparatus may be assumed to be known and has therefore not been illustrated here. Reference may be made in this connection to the cable eccentricity measurement and test apparatus of the assignee of the presently claimed invention.

Although the coil 4 is represented in the above description as the oscillating coil of an LC oscillator, this should not be regarded as in any way limiting. Since a coil through which an alternating current flows undergoes not only a change in inductance but also a change in quality factor (Q) when an electric conductor moves towards it, the measurement of thickness may, of course, also be carried out as a measurement of the quality factor of the coil, for example by means of a measuring bridge.

What is claimed is:

1. A measuring head for the inductive measurement of the thickness of an insulating layer on an electrically conductive cable, comprising:
 a coil which produces a magnetic field in the measurement region which has a shape such that the geometric locations of the points of a conductor which produce the same change in a characteristic of the coil lie on concentric circles, and a contact part having an end face which comes in contact with the cable whose insulating layer is to be measured, said end face of the contact part having a contour which conforms to one of the concentric circles.

2. A measuring head for the inductive measurement of the thickness of an insulating sheath on an electrically conductive cable, comprising:

a coil having an E-shaped core that produces a magnetic field in the measurement region which has a shape such that the geometric locations of the points of a conductor which produce the same change in a characteristic of the coil lie on concentric circles in planes perpendicular to the axis connecting the poles of the coil, and a contact part having an end face which comes in contact with the cable whose insulating sheath is to be measured, said end face of the contact part having a contour which conforms to one of the concentric circles.

3. A measuring head according to claim 2, wherein the end face of the contact part is in the shape of a circular arc corresponding to one of the concentric circles.

4. A measuring head according to claim 2, wherein the contact part is gable-shaped in cross-section when viewed in the direction of the planes of the concentric circles, and its end face consists of two side surfaces inclined at an angle to one another.

5. A measuring head according to claim 4, wherein the two side surfaces enclose an obtuse angle in the range of 120° to 150°.

6. A measuring head according to claim 4, wherein the end face of the contact part is curved in the form of a lens in the direction of the lines of the flux of the coil and perpendicular to the planes of the concentric circles.

7. A measuring head for the inductive measurement of the thickness of an insulating sheath on an electrically conductive cable, comprising:

a coil having a core that produces a magnetic field in the measurement region which has a shape such that the geometric locations of the points of a conductor which produce the same change in a characteristic of the coil lie on concentric circles in planes perpendicular to the axis connecting the poles of the coil, and a contact part having an end face which comes in contact with the cable whose insulating sheath is to be measured, said end face of the contact part having a contour which conforms to one of the concentric circles.

8. A measuring head according to claim 7, wherein the end face of the contact part is in the shape of a circular arc corresponding to one of the concentric circles.

9. A measuring head according to claim 7, wherein the contact part is gable-shaped in cross-section when viewed in the direction of the planes of the concentric circles, and its end face consists of two side surfaces inclined at an angle to one another.

10. A measuring head according to claim 9, wherein the two side surfaces enclose an obtuse angle in the range of 120° to 150°.

11. A measuring head according to claim 9, wherein the end face of the contact part is curved in the form of a lens in the direction of the lines of the flux of the coil and perpendicular to the planes of the concentric circles.

12. A measuring head according to claim 1 wherein said characteristic of the coil is its inductance.

13. A measuring head according to claim 1 wherein said characteristic of the coil is its quality factor.

14. A measuring head for the inductive measurement of the thickness of an insulating sheath on an electric cable, comprising:

a coil which produces a magnetic field having a shape such that the loci of points of equal field strengths form respective concentric circles; and a contact part having an end face which comes in contact with the insulating sheath on the cable, said end face having a contour which conforms to one of the concentric circles.

15. A measuring head according to claim 14, wherein the end face of the contact part is in the shape of a circular arc corresponding to one of the concentric circles.

16. A measuring head according to claim 14, wherein the contact part is gable-shaped in cross-section when viewed in the direction of the planes of the concentric circles, and its end face consists of two side surfaces inclined at an angle to one another.

17. A measuring head according to claim 16, wherein the two side surfaces enclose an obtuse angle in the range of 120° to 150°.

18. A measuring head for the inductive measurement of the thickness of an insulating sheath on an electric cable, comprising:

a coil which produces a magnetic field having a shape such that the loci of points of equal field strengths form respective concentric circles; and a contact part that is gable-shaped in cross-section when viewed in the direction of the planes of the concentric circles and having an end face which comes in contact with the insulating layer on the conductor, said end face consisting of two side surfaces inclined at an angle to one another and being curved at their intersection in the form of a lens in the direction of the lines of the flux of the coil and perpendicular to the planes of the concentric circles so as to conform to one of the concentric circles.

19. A measuring head according to claim 14, wherein said coil has an E-shaped core and the concentric circles lie in planes perpendicular to the axis connecting the poles of the coil.

20. A measuring head according to claim 14, wherein said coil has a core and the concentric circles lie in planes perpendicular to the axis connecting the poles of the coil.

* * * * *